US012691812B2

(12) United States Patent
Keechle

(10) Patent No.: US 12,691,812 B2
(45) Date of Patent: Jul. 28, 2026

(54) RATCHET STRAP ASSEMBLY

(71) Applicant: John Keechle, Baker, FL (US)

(72) Inventor: John Keechle, Baker, FL (US)

( * ) Notice: Subject to any disclaimer, the term of this patent is extended or adjusted under 35 U.S.C. 154(b) by 355 days.

(21) Appl. No.: 18/587,318

(22) Filed: Feb. 26, 2024

(65) Prior Publication Data

US 2025/0269784 A1 Aug. 28, 2025

(51) Int. Cl.
B60P 7/08 (2006.01)

(52) U.S. Cl.
CPC ............. B60P 7/083 (2013.01); B60P 7/0823 (2013.01)

(58) Field of Classification Search
CPC ....... B60P 7/083; B60P 7/0823; B60P 7/0807; B60P 7/0846; B65G 7/12; A45F 2003/142
See application file for complete search history.

(56) References Cited

U.S. PATENT DOCUMENTS 5,423,644 A * 6/1995 First, Sr. ................ A44B 11/14
                                                    24/68 CD
8,827,245 B2 * 9/2014 Pate ......................... A22B 5/00
                                                    254/1
2022/0379799 A1 * 12/2022 Brown .................. B60P 7/0823

* cited by examiner

*Primary Examiner* — Daniel J Colilla
(74) *Attorney, Agent, or Firm* — The Iwashko Law Firm, PLLC; Lev Ivan Gabriel Iwashko

(57) ABSTRACT
A ratchet strap assembly, including a main fixed strap, a main adjustable strap, a secondary fixed strap, and a secondary adjustable strap.

2 Claims, 3 Drawing Sheets

RATCHET STRAP ASSEMBLY

BACKGROUND

1. Field

The present general inventive concept relates generally to a ratchet strap, and particularly, to an improved ratchet strap assembly.

2. Description of the Related Art

Ratchet straps have been used for many years to help users secure bulky items to car roofs, flatbeds, trunks, or any other object.

However, conventional ratchet straps merely include a webbing, a tensioning device, and two connection members.

As such, it is difficult to truly secure heavy and/or bulky items with confidence that the items will not move during transport.

Therefore, there is a need for an improved ratchet strap system that ensures that items that are strapped down remain immobile during transport.

There is also a need for an improved ratchet strap system that allows for quick and convenient adjustment.

SUMMARY

The present general inventive concept provides an improved ratchet strap assembly.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a ratchet strap assembly, including a main fixed strap, including a main fixed strap webbing, a main fixed strap connection member disposed at a first end of the main fixed strap webbing to secure the main fixed strap to a first object, and a main fixed strap tensioning device disposed at a second end of the main fixed strap webbing, a main adjustable strap, including a main adjustable strap webbing, a main adjustable strap connection member disposed at a first end of the main adjustable strap webbing to secure the main adjustable strap to a second object, and a main adjustable strap loop disposed at a second end of the main adjustable strap webbing such that the main adjustable strap loop is threadable through the main fixed strap tensioning device, a secondary fixed strap, including a secondary fixed strap webbing, a secondary fixed strap connection member disposed at a first end of the secondary fixed strap webbing to receive a portion of the main adjustable strap webbing therethrough, and a secondary fixed strap tensioning device disposed at a second end of the secondary fixed strap webbing, and a secondary adjustable strap, including a secondary adjustable strap webbing, a secondary adjustable strap connection member disposed at a first end of the secondary adjustable strap webbing to receive another portion of the main adjustable strap webbing therethrough, and a secondary adjustable strap loop disposed at a second end of the secondary adjustable strap webbing, such that the secondary adjustable strap loop is threadable through the secondary fixed strap tensioning device.

Pulling on the main adjustable strap loop may cause the main fixed strap tensioning device to ratchet to thereby cause an overall length of the main fixed strap webbing and main adjustable strap webbing to shorten, and pulling on the secondary adjustable strap loop may cause the secondary fixed strap tensioning device to ratchet to thereby cause an overall length of the secondary fixed strap webbing and secondary adjustable strap webbing to shorten.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
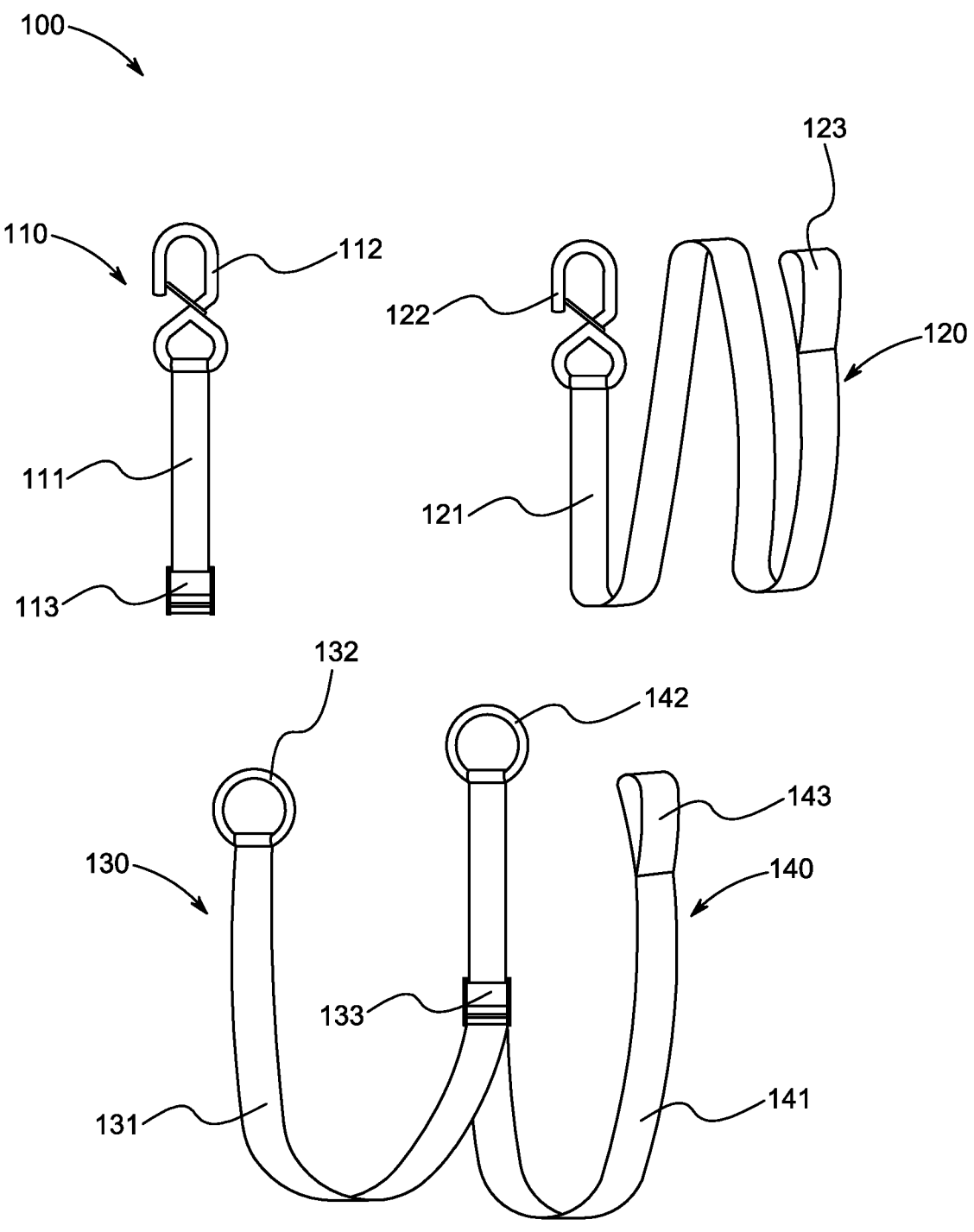
FIG. 1 illustrates a ratchet strap assembly in a partially disassembled state, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Ratchet Strap Assembly 100
Main Fixed Strap 110
Main Fixed Strap Webbing 111
Main Fixed Strap Connection Member 112
Main Fixed Strap Tensioning Device 113
Main Adjustable Strap 120
Main Adjustable Strap Webbing 121
Main Adjustable Strap Connection Member 122
Main Adjustable Strap Loop 123
Secondary Fixed Strap 130
Secondary Fixed Strap Webbing 131
Secondary Fixed Strap Connection Member 132
Secondary Fixed Strap Tensioning Device 133
Secondary Adjustable Strap 140
Secondary Adjustable Strap Webbing 141
Secondary Adjustable Strap Connection Member 142
Secondary Adjustable Strap Loop 143

FIG. 1 illustrates a ratchet strap assembly 100 in a partially disassembled state, according to an exemplary embodiment of the present general inventive concept.

Figure 2:
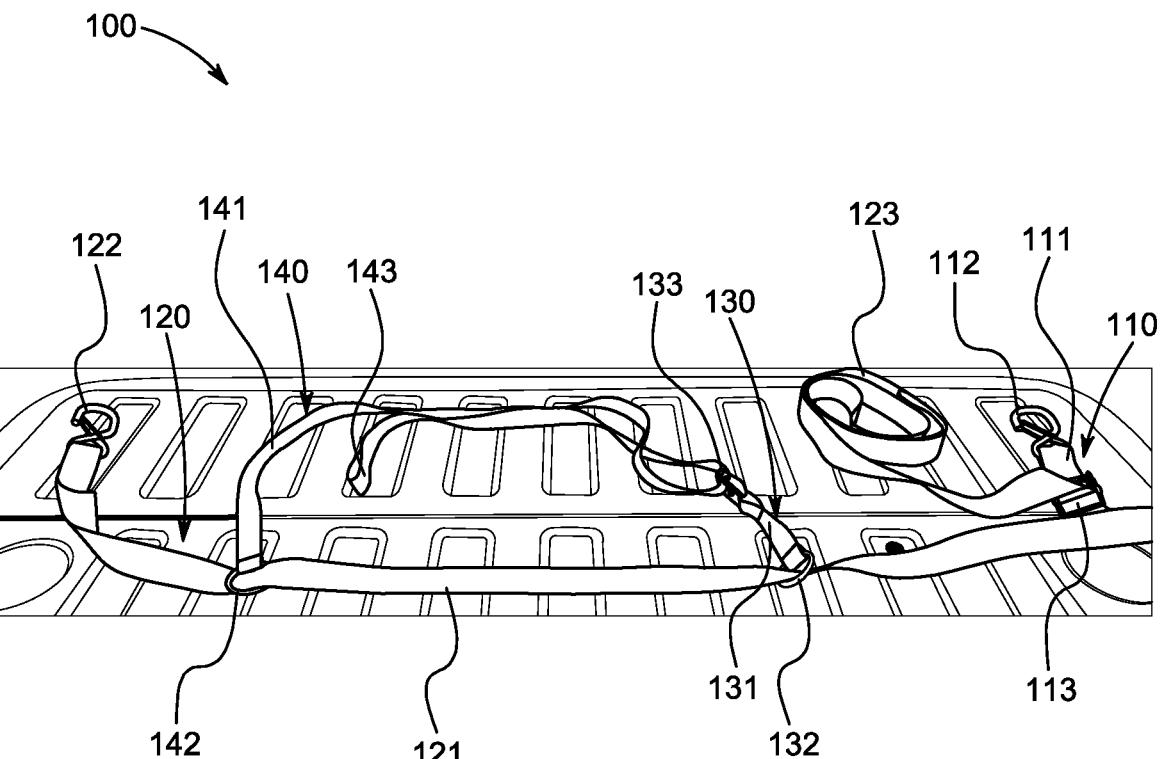
FIG. 2 illustrates the ratchet strap assembly of FIG. 1 in an assembled state, according to an exemplary embodiment of the present general inventive concept.

FIG. 2 illustrates the ratchet strap assembly 100 of FIG. 1 in an assembled state, according to an exemplary embodiment of the present general inventive concept.

Figure 3:
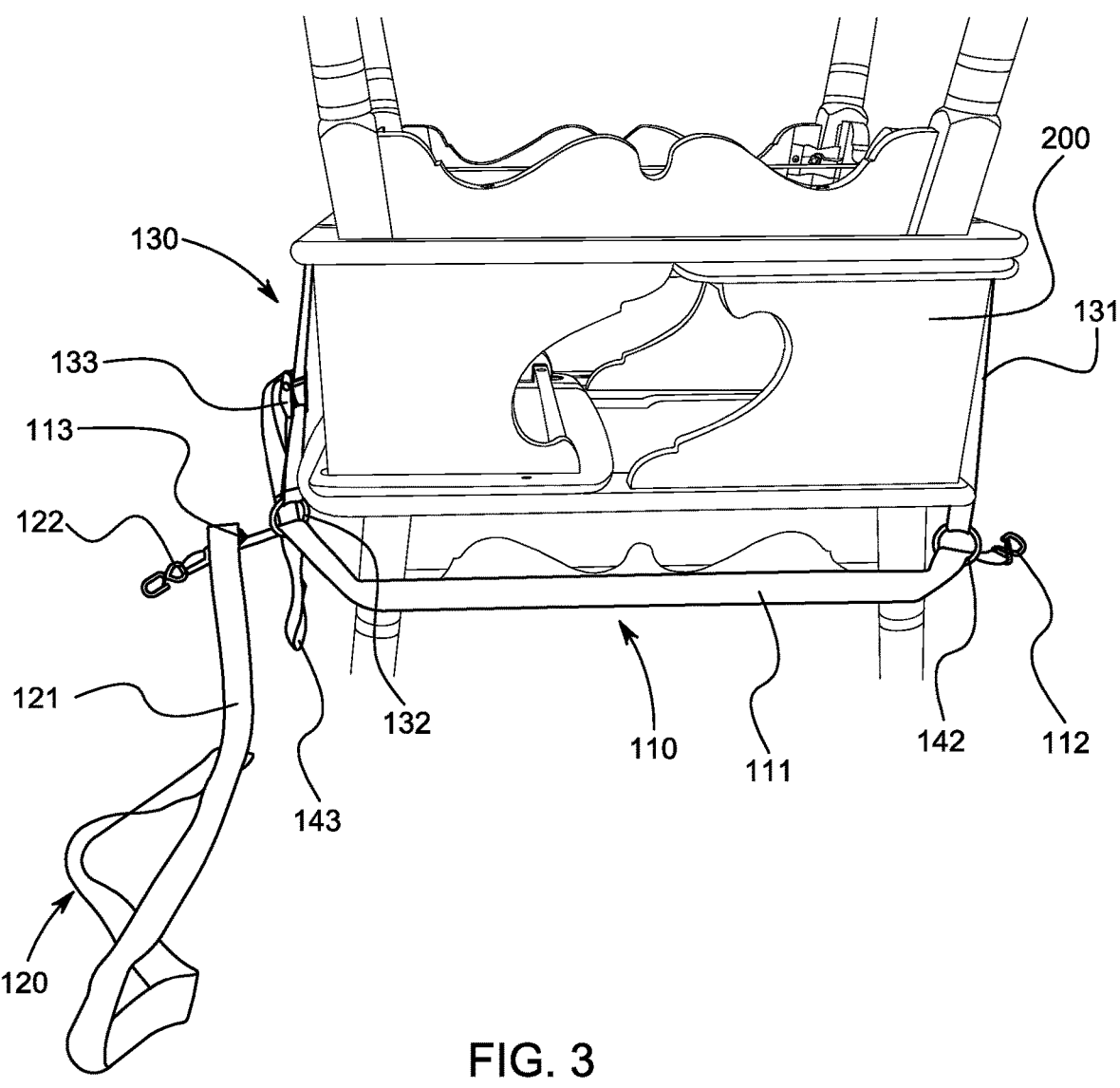
FIG. 3 illustrates the ratchet strap assembly of FIG. 2 securing a table, according to an exemplary embodiment of the present general inventive concept.

FIG. 3 illustrates the ratchet strap assembly 100 of FIG. 2 securing a table 200, according to an exemplary embodiment of the present general inventive concept.

The ratchet strap assembly 100, and all components therein and/or connected thereto, may be constructed from at least one of metal, plastic, wood, silicone, glass, polyester, fabric, and rubber, etc., but is not limited thereto, and can be constructed from any material known to one of ordinary skill in the art.

Referring to FIG. 1, the ratchet strap assembly 100 may include a main fixed strap 110, a main adjustable strap 120, a secondary fixed strap 130, and a secondary adjustable strap 140, but is not limited thereto.

The main fixed strap 110 may include a main fixed strap webbing 111, a main fixed strap connection member 112, and a main fixed strap tensioning device 113, but is not limited thereto.

The main fixed strap webbing 111 may be a polyester and/or nylon webbing that is between 1 and 4 inches in thickness, but it is not limited thereto, and may be constructed from any type of material known to one of ordinary skill in the art.

The main fixed strap connection member 112 may be a flat hook, a grab hook, a chain anchor, a snap hook, a wire hook, a D-ring, an E-track fitting, and an L-track fitting, but is not limited thereto, and may be any type of connection member known to one of ordinary skill in the art. For ease of description, the main fixed strap connection member 112 will be referred to as a snap hook, as depicted in FIG. 1, but it is not limited thereto.

The main fixed strap tensioning device 113 may be a ratchet-type tensioning device, a crank, or any other type of tensioning device known to one of ordinary skill in the art. For ease of description, the main fixed strap tensioning device 113 will be referred to as ratchet device, as depicted in FIG. 1, but it is not limited thereto.

The main fixed strap connection member 112 may be disposed at a first end of the main fixed strap webbing 111, and the main fixed strap tensioning device 113 may be disposed at a second end of the main fixed strap webbing 111.

The main adjustable strap 120 may include a main adjustable strap webbing 121, a main adjustable strap connection member 122, and a main adjustable strap loop 123, but is not limited thereto.

The main adjustable strap webbing 121 may be a polyester and/or nylon webbing that is between 1 and 4 inches in thickness, but it is not limited thereto, and may be constructed from any type of material known to one of ordinary skill in the art.

The main adjustable strap connection member 122 may be a flat hook, a grab hook, a chain anchor, a snap hook, a wire hook, a D-ring, an E-track fitting, and an L-track fitting, but is not limited thereto, and may be any type of connection member known to one of ordinary skill in the art. For ease of description, the main adjustable strap connection member 122 will be referred to as a snap hook, as depicted in FIG. 1, but it is not limited thereto.

The main adjustable strap loop 123 may be a loop formed by the webbing of the main adjustable strap webbing 121, but is not limited thereto.

The main adjustable strap connection member 122 may be disposed at a first end of the main adjustable strap webbing 121, and the main adjustable strap loop 123 may be disposed at a second end of the main adjustable strap webbing 121.

In order to connect the main adjustable strap 120 to the main fixed strap 110, the main adjustable strap loop 123 may be threaded through the main fixed strap tensioning device 113 until a desired length of the combination of the main adjustable strap 120 and the main fixed strap 110 is achieved. The main fixed strap tensioning device 113 may be tightened (e.g., ratcheted) based on a user's preference.

The secondary fixed strap 130 may include a secondary fixed strap webbing 131, a secondary fixed strap connection member 132, and a secondary fixed strap tensioning device 133, but is not limited thereto.

The secondary fixed strap webbing 131 may be a polyester and/or nylon webbing that is between 1 and 4 inches in thickness, but it is not limited thereto, and may be constructed from any type of material known to one of ordinary skill in the art.

The secondary fixed strap connection member 132 may be a flat hook, a grab hook, a chain anchor, a snap hook, a wire hook, a D-ring, an E-track fitting, and an L-track fitting, but is not limited thereto, and may be any type of connection member known to one of ordinary skill in the art. For ease of description, the secondary fixed strap connection member 132 will be referred to as a D-ring, as depicted in FIG. 1, but it is not limited thereto.

The secondary fixed strap tensioning device 133 may be a ratchet-type tensioning device, a crank, or any other type of tensioning device known to one of ordinary skill in the art. For ease of description, the secondary fixed strap tensioning device 133 will be referred to as ratchet device, as depicted in FIG. 1, but it is not limitedthereto.

The secondary fixed strap connection member 132 may be disposed at a first end of the secondary fixed strap webbing 131, and the secondary fixed strap tensioning device 133 may be disposed at a second end of the secondary fixed strap webbing 131.

The secondary adjustable strap 140 may include a secondary adjustable strap webbing 141, a secondary adjustable strap connection member 142, and a secondary adjustable strap loop 143, but is not limited thereto.

The secondary adjustable strap webbing 141 may be a polyester and/or nylon webbing that is between 1 and 4 inches in thickness, but it is not limited thereto, and may be constructed from any type of material known to one of ordinary skill in theart.

The secondary adjustable strap connection member 142 may be a flat hook, a grab hook, a chain anchor, a snap hook, a wire hook, a D-ring, an E-track fitting, and an L-track fitting, but is not limited thereto, and may be any type of connection member known to one of ordinary skill in the art. For ease of description, the secondary adjustable strap connection member 142 will be referred to as a D-ring, as depicted in FIG. 1, but it is not limited thereto.

The secondary adjustable strap loop 143 may be a loop formed by the webbing of the secondary adjustable strap webbing 141, but is not limited thereto.

The secondary adjustable strap connection member 142 may be disposed at a first end of the secondary adjustable strap webbing 141, and the secondary adjustable strap loop 143 may be disposed at a second end of the secondary adjustable strap webbing 141.

In order to connect the secondary adjustable strap 140 to the secondary fixed strap 130, the secondary adjustable strap loop 143 may be threaded through the secondary fixed strap tensioning device 133 until a desired length of the combination of the secondary adjustable strap 140 and the secondary fixed strap 130 is achieved. The secondary fixed strap tensioning device 133 may be tightened (e.g., ratcheted) based on a user's preference.

Referring to FIGS. 2 and 3, if a user desires to securely tie down a table 200 against some type of stationary item, such as against a flatbed of a pickup truck for example, then the user may secure the main fixed strap connection member 112 to an object and then secure the main adjustable strap connection member 122 to another object, while having inserted the main adjustable strap webbing 121 through the secondary fixed strap connection member 132 and the secondary adjustable strap connection member 142, such that the tightening of the main fixed strap tensioning device 113 and the secondary fixed strap tensioning device 133 causes various portions of the ratchet strap assembly 100 to tighten against the table 200 and any other entity in contact therewith, in order to secure the table 200 to that particular stationary item.

The present general inventive concept may include ratchet strap assembly 100, including a main fixed strap 110, including a main fixed strap webbing 111, a main fixed strap connection member 112 disposed at a first end of the main fixed strap webbing 111 to secure the main fixed strap 110 to a first object, and a main fixed strap tensioning device 113 disposed at a second end of the main fixed strap webbing 111, a main adjustable strap 120, including a main adjustable strap webbing 121, a main adjustable strap connection member 122 disposed at a first end of the main adjustable strap webbing 121 to secure the main adjustable strap 120 to a second object, and a main adjustable strap loop 123 disposed at a second end of the main adjustable strap webbing 121 such that the main adjustable strap loop 123 is threadable through the main fixed strap tensioning device 113, a secondary fixed strap 130, including a secondary fixed strap webbing 131, a secondary fixed strap connection member 132 disposed at a first end of the secondary fixed strap webbing 131 to receive a portion of the main adjustable strap webbing 111 therethrough, and a secondary fixed strap tensioning device 133 disposed at a second end of the secondary fixed strap webbing 131, and a secondary adjustable strap 140, including a secondary adjustable strap webbing 141, a secondary adjustable strap connection member 142 disposed at a first end of the secondary adjustable strap webbing 141 to receive another portion of the main adjustable strap webbing 111 therethrough, and a secondary adjustable strap loop 143 disposed at a second end of the secondary adjustable strap webbing 141, such that the secondary adjustable strap loop 143 is threadable through the secondary fixed strap tensioning device 133.

Pulling on the main adjustable strap loop 123 may cause the main fixed strap tensioning device 113 to ratchet to thereby cause an overall length of the main fixed strap webbing 111 and main adjustable strap webbing 121 to shorten, and pulling on the secondary adjustable strap loop 143 may cause the secondary fixed strap tensioning device 133 to ratchet to thereby cause an overall length of the secondary fixed strap webbing 131 and secondary adjustable strap webbing 141 to shorten.

A purpose of the present general inventive concept is to provide users with an improved ratchet strap design that features a secondary strap for added support. Traditional ratchet straps often leave individuals with a tangled mess as they attempt to manage multiple straps which can be a time-consuming and inefficient task before one is even able to use the holding accessory. Moreover, traditional straps may not provide the level of strapping security needed for larger items to ensure its positioning. Ingenious and practical, the present general inventive concept offers a modern accessory that eliminates the need for multiple straps and provides enhanced security and stability for all items, whether it is used by moving companies, boat enthusiasts, or the everyday consumer. Expanding on the initial design of a basic tie-down strap, the present general inventive concept introduces a novel two piece strap that provides additional support, ensuring that even larger or irregularly shaped items remain stable during transit. To further enhance functionality, the present general inventive concept features user-friendly cam buckles that allow users to effortlessly pull slack and tighten down their cargo effectively. This innovative, top-quality product simplifies the cargo securing process, enhances stability, and eliminates the need for multiple straps. As a result, the present general inventive concept may prove to be essential in the tools/gadgetsindustry.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A ratchet strap assembly, comprising:
a main fixed strap, comprising:
  a main fixed strap webbing,
  a main fixed strap connection member disposed at a first end of the main fixed strap webbing to secure the main fixed strap to a first object, and
  a main fixed strap tensioning device disposed at a second end of the main fixed strap webbing;
a main adjustable strap, comprising:
  a main adjustable strap webbing, a main adjustable strap connection member disposed at a first end of the main adjustable strap webbing to secure the main adjustable strap to a second object, and a main adjustable strap loop disposed at a second end of the main adjustable strap webbing such that the main adjustable strap loop is threadable through the main fixed strap tensioning device;

a secondary fixed strap, comprising:

a secondary fixed strap webbing, a secondary fixed strap connection member disposed at a first end of the secondary fixed strap webbing to receive a portion of the main adjustable strap webbing therethrough, and a secondary fixed strap tensioning device disposed at a second end of the secondary fixed strap webbing; and a secondary adjustable strap, comprising:

a secondary adjustable strap webbing, a secondary adjustable strap connection member disposed at a first end of the secondary adjustable strap webbing to receive another portion of the main adjustable strap webbing therethrough, and a secondary adjustable strap loop disposed at a second end of the secondary adjustable strap webbing, such that the secondary adjustable strap loop is threadable through the secondary fixed strap tensioning device.

2. The ratchet strap assembly of claim 1, wherein:

pulling on the main adjustable strap loop causes the main fixed strap tensioning device to ratchet to thereby cause an overall length of the main fixed strap webbing and main adjustable strap webbing to shorten, and pulling on the secondary adjustable strap loop causes the secondary fixed strap tensioning device to ratchet to thereby cause an overall length of the secondary fixed strap webbing and secondary adjustable strap webbing to shorten.

* * * * *